(12) United States Patent
Wu et al.

(10) Patent No.: US 12,101,529 B1
(45) Date of Patent: Sep. 24, 2024

(54) CLIENT SIDE AUGMENTED REALITY OVERLAY

(71) Applicant: Amazon Technologies, Inc., Seattle, WA (US)

(72) Inventors: Yongjun Wu, Bellevue, WA (US); Zaixi Shang, Austin, TX (US); Sriram Sethuraman, Bangalore (IN); Hai Wei, Seattle, WA (US); Xiaohan Nie, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 17/448,039

(22) Filed: Sep. 17, 2021

(51) Int. Cl.
| | |
|---|---|
| *H04N 7/10* | (2006.01) |
| *G06T 5/70* | (2024.01) |
| *G06T 7/11* | (2017.01) |
| *G06T 7/194* | (2017.01) |
| *G06T 11/00* | (2006.01) |
| *G06V 10/22* | (2022.01) |
| *G06V 20/40* | (2022.01) |
| *H04N 21/44* | (2011.01) |
| *H04N 21/488* | (2011.01) |
| *H04N 21/81* | (2011.01) |

(52) U.S. Cl.
CPC ......... *H04N 21/44008* (2013.01); *G06T 5/70* (2024.01); *G06T 7/11* (2017.01); *G06T 7/194* (2017.01); *G06T 11/00* (2013.01); *G06V 10/225* (2022.01); *G06V 20/40* (2022.01); *H04N 21/488* (2013.01); *H04N 21/812* (2013.01); *G06T 2207/10016* (2013.01); *G06T 2207/30221* (2013.01)

(58) Field of Classification Search
CPC .......... H04N 21/44008; H04N 21/488; H04N 21/812; G06T 5/002; G06T 7/11; G06T 7/194; G06T 11/00; G06T 2207/10016; G06T 2207/30221; G06V 10/225; G06V 20/40

USPC ......................................................... 725/32
See application file for complete search history.

(56) References Cited

U.S. PATENT DOCUMENTS

| | | | |
|---|---|---|---|
| 10,096,169 B1 | 10/2018 | Chenillo et al. | |
| 10,121,093 B2 * | 11/2018 | Li | G06V 10/462 |
| 11,468,578 B2 * | 10/2022 | Nie | G06V 20/42 |
| 11,657,850 B2 * | 5/2023 | Ahmed | G06V 20/64 |
| | | | 386/278 |
| 2008/0126226 A1 | 5/2008 | Popkiewicz et al. | |
| 2009/0144801 A1 | 6/2009 | Grouf et al. | |

(Continued)

OTHER PUBLICATIONS

Gysin, "AdApt: On-screen | Rivals race to perfect Digital Replacement Technology before Qatar 2022," Apr. 18, 2018, <https://www.linkedin.com/pulse/on-screen-rivals-race-perfect-digital-replacement-technology-gysin/> Downloaded Sep. 17, 2021, 13 pages.

(Continued)

*Primary Examiner* — Jefferey F Harold
*Assistant Examiner* — Sahar Aqil Riaz
(74) *Attorney, Agent, or Firm* — Weaver Austin Villeneuve & Sampson LLP (57) ABSTRACT

Techniques are described for facilitating client-side augmented reality overlay of secondary content during live events. Regions for overlaying secondary content are identified along with attributes for each region. A client device (Continued)

may then used the attributes to overlay secondary content in each region prior to playback.

8 Claims, 7 Drawing Sheets

(56) References Cited

U.S. PATENT DOCUMENTS

| | | | |
|---|---|---|---|
| 2009/0284601 A1* | 11/2009 | Eledath | G06T 7/215 |
| | | | 375/E7.076 |
| 2011/0050595 A1* | 3/2011 | Lundback | G06F 3/0425 |
| | | | 345/173 |
| 2011/0188836 A1 | 8/2011 | Popkiewicz et al. | |
| 2012/0299961 A1* | 11/2012 | Ramkumar | G06Q 30/0643 |
| | | | 345/632 |
| 2014/0359656 A1 | 12/2014 | Banica et al. | |
| 2015/0071613 A1 | 3/2015 | Dharssi et al. | |
| 2015/0206343 A1 | 7/2015 | Mattila et al. | |
| 2015/0229948 A1* | 8/2015 | Puri | H04N 19/117 |
| | | | 375/240.03 |
| 2015/0334398 A1* | 11/2015 | Socek | H04N 19/182 |
| | | | 375/240.26 |
| 2016/0050465 A1* | 2/2016 | Zaheer | H04N 21/6125 |
| | | | 725/34 |
| 2016/0086379 A1* | 3/2016 | Sadi | G02B 27/0093 |
| | | | 345/633 |
| 2016/0335806 A1* | 11/2016 | Chan | G09G 3/007 |
| 2017/0034583 A1 | 2/2017 | Long et al. | |
| 2017/0272485 A1 | 9/2017 | Gordon et al. | |
| 2017/0374398 A1 | 12/2017 | Rao et al. | |
| 2018/0096528 A1 | 4/2018 | Needham et al. | |
| 2018/0131975 A1 | 5/2018 | Badawiyeh et al. | |
| 2018/0336704 A1* | 11/2018 | Javan Roshtkhari | G06T 7/80 |
| 2019/0238952 A1* | 8/2019 | Boskovich | G06F 16/7837 |
| 2019/0294881 A1 | 9/2019 | Polak et al. | |
| 2019/0342356 A1 | 11/2019 | Thomas et al. | |
| 2020/0020075 A1* | 1/2020 | Khwaja | G06T 5/002 |
| 2020/0066025 A1 | 2/2020 | Peebler et al. | |
| 2021/0056750 A1* | 2/2021 | Rowley | G06F 3/016 |
| 2021/0329338 A1 | 10/2021 | Khov et al. | |
| 2022/0180898 A1 | 6/2022 | Ahmed et al. | |

OTHER PUBLICATIONS

Nie et al., "A Robust and Efficient Framework for Sports-Field Registration," 2021, <https://openaccess.thecyf.com/content/WACV2021/papers/Nie_A_Robust_and_Efficient_Framework_for_Sports-Field_Registration_WACV_2021_paper.pdf> Downloaded Sep. 17, 2021, 9 pages.

Deloitte Perspectives: "Product placement effectiveness on cord-cutters", Nov. 21, 2019, https://www2.deloitte.com/us/en/pages/technology-media-and-telecommunications/articles/product-placement-effectiveness-on-cord-cutters.html# [retrieved on Dec. 9, 2020].

Edison: "Myriad opportunities: Mirriad Advertising", Jul. 14, 2020 https://www.edisongroup.com/publication/myriad-opportunities/27276/ [retrieved on Dec. 9, 2020].

Grzyb, Tomasz et al. "Is Product Placement Really Worse Than Traditional Commercials? Cognitive Load and Recalling of Advertised Brands" *Frontiers in Psychology*, vol. 9, Article 1519. Published online Aug. 20, 2018, doi:10.3389/fpsyg.2018.01519.

NetImperative: "Tencent uses AI to put product placement ads into old movies", Oct. 18, 2019 http://www.netimperative.com/2019/10/18/tencent-uses-ai-to-put-product-placement-ads-into-old-movies/ [retrieved on Dec. 9, 2020].

VentureBeat: "Ryff lets advertisers place any virtual object into commercials and films", Sep. 13, 2018 https://venturebeat.com/2018/09/13/ryff-lets-advertisers-place-any-virtual-object-into-commercials-and-films/ [retrieved on Dec. 9, 2020].

U.S. Appl. No. 17/247,393, filed Dec. 9, 2020, Ahmed et al.

U.S. Non-Final office Action dated Sep. 22, 2022 in U.S. Appl. No. 17/247,393.

U.S. Notice of Allowance dated Jan. 18, 2023 in U.S. Appl. No. 17/247,393.

International Search Report and Written Opinion dated Feb. 22, 2022, in Application No. PCT/US2021/072525.

US Final Office Action dated May 24, 2022, in U.S. Appl. No. 17/247,393.

US Office Action dated Dec. 7, 2021, in U.S. Appl. No. 17/247,393.

* cited by examiner

CLIENT SIDE AUGMENTED REALITY OVERLAY

BACKGROUND

Video content may be provided through a number of media, such as television and the Internet. Live events (e.g., sporting events or concerts) may be streamed in real time by providing live manifests throughout the event on the most recently encoded fragments available. Advertisements inserted between segments of the live event may disrupt the viewing experience for a user and potentially disrupt the event, particularly for sporting events that have long periods of uninterrupted play, such as soccer.

DETAILED DESCRIPTION

This disclosure describes techniques for overlaying secondary content on regions of video frames of a media presentation by a client device. Live events (e.g., sports and concerts) typically include providing segments of a media presentation of the live event to a client device for playback in near real time to the event. Advertisements inserted between segments of the live event may disrupt the viewing experience for a user and potentially disrupt the event, particularly for sporting events that have long periods of uninterrupted play, such as soccer.

Live events may present opportunities for advertisements or other content to be integrated into the media content for display to a user. Advertisements may be placed into the live event without interrupting the viewing experience for a user. Advertisements may be integrated with the live event by utilizing virtual product placements (VPPs) that insert advertisements into regions of video frames of the live event. While VPP may be performed on the server side, this limits the personalization of advertisements, as a separate encoder would be required for each blend of VPP inserted into the video frames. As described and enabled herein, personalization may be efficiently achieved by providing the media segments and advertising content (or other secondary content) to client devices separately and having the client perform the VPP. To improve processing efficiency and reduce the load on the client, regions for inserting secondary content and associated attributes may be determined on the server side and then transmitted to the client, reducing the resource requirements for each client device to overlay the secondary content. An example may be instructive.

Figure 1A:
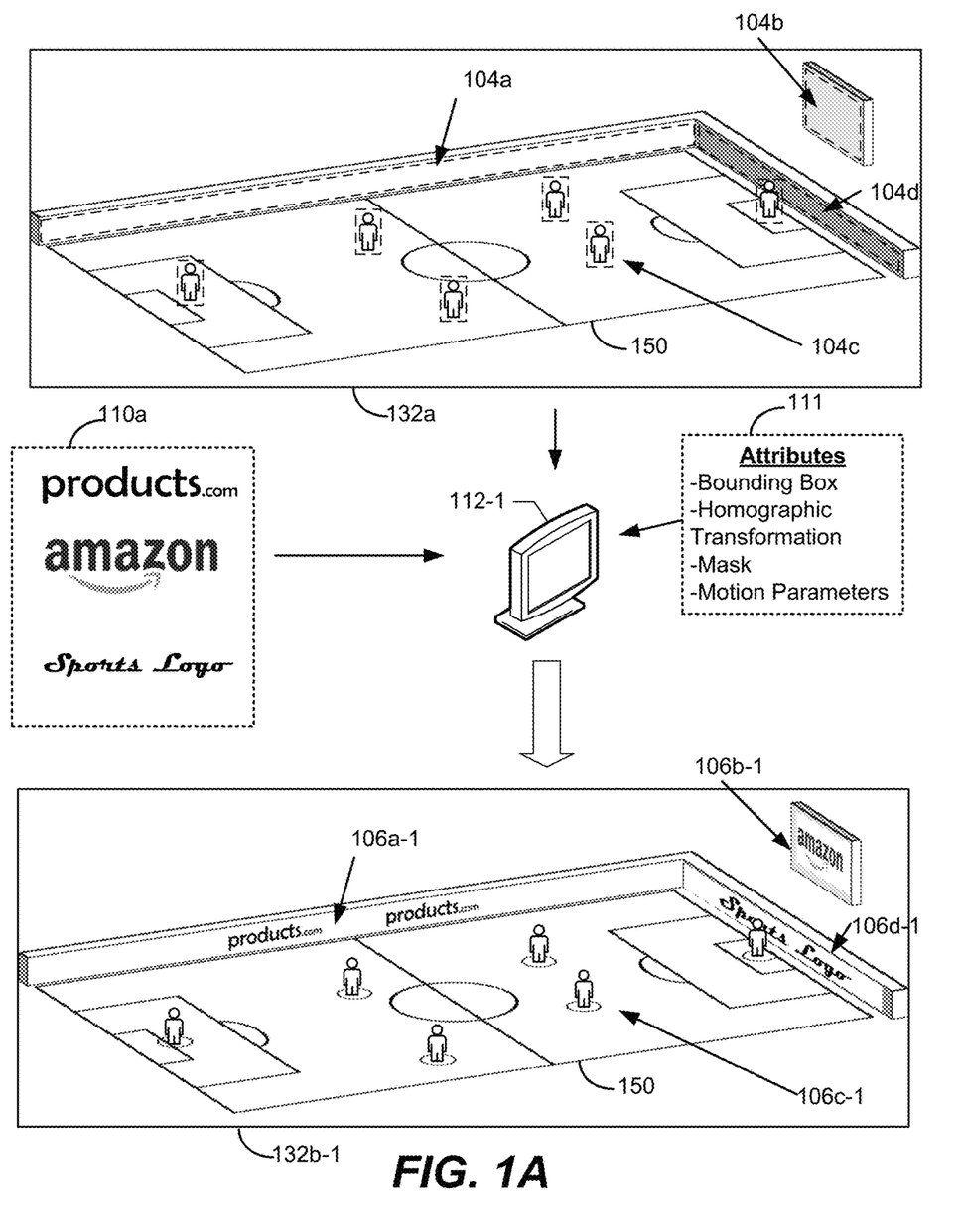
FIGS. 1A and 1B presents an example of an implementation of client-side content integration.

FIG. 1A presents an example of client-side secondary content overlay. Frame 132a is an off-axis view of a sports field 150 including players 104c, perimeters 104a and 104d, and a billboard 104b (collectively referred to as "regions"). In a sporting event, there may be multiple video cameras capturing the game from many different locations and at different angles. For example, there may be video cameras providing views of the playing field from the sides, and there may be video cameras providing views of the playing field from above. At any one time, the broadcasting team may select a view from one of the video cameras to be a prime view or a view that is visible to the viewers. For some implementations, the view of the playing field provided by the video camera selected by the broadcasting team may be used to perform region identification and overlay secondary content. It may be possible that multiple views from multiple video cameras may be stitched to generate a stitched view. In the scenario where there is a stitched view, the stitched view may be used to identify regions and overlay secondary content.

As shown in frame 132a, quadrilaterals outline each region. The quadrilaterals may define a bounding box that corresponds with a region for overlaying secondary content. For the perimeter and billboard the secondary content may be an advertisement, while for the players the secondary content may be a visualization emphasis object that assists viewers in identifying players on the field, including which player has possession of a play object. The bounding box may cover the entire outline of a player or object as the player or object appears in the frame. Bounding boxes are an example of an attribute 111 that may be associated with each region of frame 132a. In some implementations, region identification logic (e.g., logic 220 of FIG. 2 or 3) may analyze frame 132a to detect regions included in frame 132a. Region identification logic may also track regions across video frames, particularly where the camera view is changed.

A server may determine the bounding boxes associated with each object or player. For some implementations, region identification logic may be configured to keep track of the bounding boxes associated with each of the regions in the frame 132a. For example, this may help with identifying a bounding box associated with a player with possession of a play object or maintaining a bounding box associated with a billboard as the camera pans, tilts, or zooms. In some implementations, a bounding box may not be visible to the viewers. In the example of FIG. 1A bounding boxes are illustrated for explanatory purposes, but a video frame provided to a client device would not include such bounding boxes.

Furthermore, the server may determine, for each region, a homography transformation between an image plane of frame 132a and a plane associated with each region. The image plane may refer to the plane of the camera lens (e.g., the plane of frame 132a) or the plane of received secondary content (e.g., the plane of the logos 110). The plane associated with each region may vary between regions. For perimeters 104a and 104d and billboard 104b, the homography transformation will be between the image plane and the respective surfaces of each object. For the players the associated plane may be the ground plane.

The bounding boxes and homography transformation may be referred to as attributes of the regions corresponding to each of the objects and players. Other attributes that are determined for each region include a mask, which defines background and foreground pixels for that region. It is desirable for the secondary content to be properly overlaid such that it does not obscure players or other objects in the frame. The mask may define which parts of the secondary content to overlay to ensure proper occlusion of objects. Attributes may also include various parameters and/or artifacts, such as motion blur parameters, compression artifacts, or down-sampling artifacts.

Frame 132a, along with the attributes noted above, are sent to a client device 112-1 along with secondary content 110a. In the example of FIG. 1A secondary content 110 includes various logos as two-dimensional static content items. A secondary content item may be referred to as a secondary content "overlay." A secondary content overlay can include secondary content represented on a background that is either transparent or opaque. A secondary content item can include an image, text, a video, animation, or other form of content. In some instances, a secondary content item can include a representation of a 3D product or 2D branding. In this example, secondary content 110a includes three different logos: Amazon.com, products.com, and Sports Logo. Secondary content 110a may be selected for personalization to client device 112-1 based on, e.g., the location of client device 112-1.

Client device 112-1 may then produce frame 132b-1 based on frame 132a, the attributes 111, and secondary content 110a. Frame 132b-1 has been generated to overlay secondary content 110 on the perimeters 106a-1 and 106d-1 as well as the billboard 106b-1, as well as a visualization emphasis object with each player 106c-1 in the shape of an ellipse. Based on the bounding box and homographic transformation, each logo of secondary content 110a has been transformed to maintain a perspective that appears realistic. Furthermore, the ellipses under players 106c-1 are also placed relative to the ground plane to appear as if they were placed upon the ground plane around each player. In some implementations, the size of a visualization emphasis object may vary depending on the size of the bounding box associated with the player.

Occlusion effects are also applied to secondary content 110a, as shown by perimeter 106d-1. A player is standing in front of the perimeter, occluding a portion of the perimeter. The attributes 111 include a mask that indicates the person as part of the foreground, and thus the secondary content is not be rendered and overlaid on that portion.

Figure 1B:
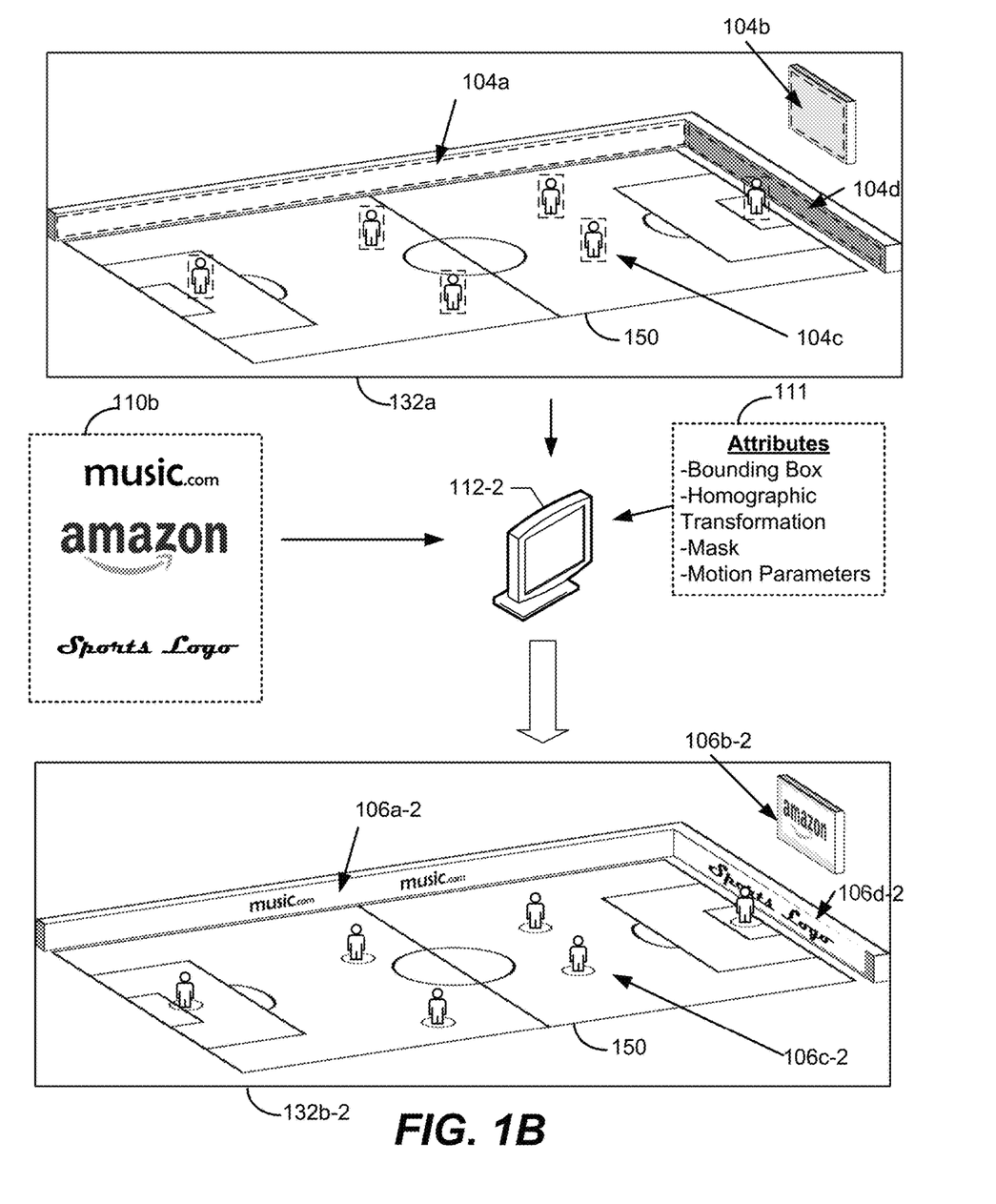

FIG. 1B presents an example of client-side secondary content overlay for the same media presentation shown in FIG. 1A, but with a different client device and different secondary content. In FIG. 1B, frame 132a and attributes 111 are provided to a client device 112-2 along with secondary content 110b. The secondary content 110b provided to client device 112-2 is personalized to client device 112-2, and thus has non-overlapping logs with secondary content 110a, in particular a logo for music.com instead of products.com. Video frame 132a and attributes 111 provided to client device 112-2 are the same as video frame 132a and attributes 111 provided to client device 112-1. Client device 112-2 then produces frame 132b-2 based on frame 132a, attributes 111, and secondary content 110b.

Frames 132b-1 and 132b-2 are each produced by their respective client devices and are different based on the different secondary content overlaid on frame 132a. The client devices may then play back the frames with the overlaid content for viewing by a user with personalized secondary content.

Figure 2:
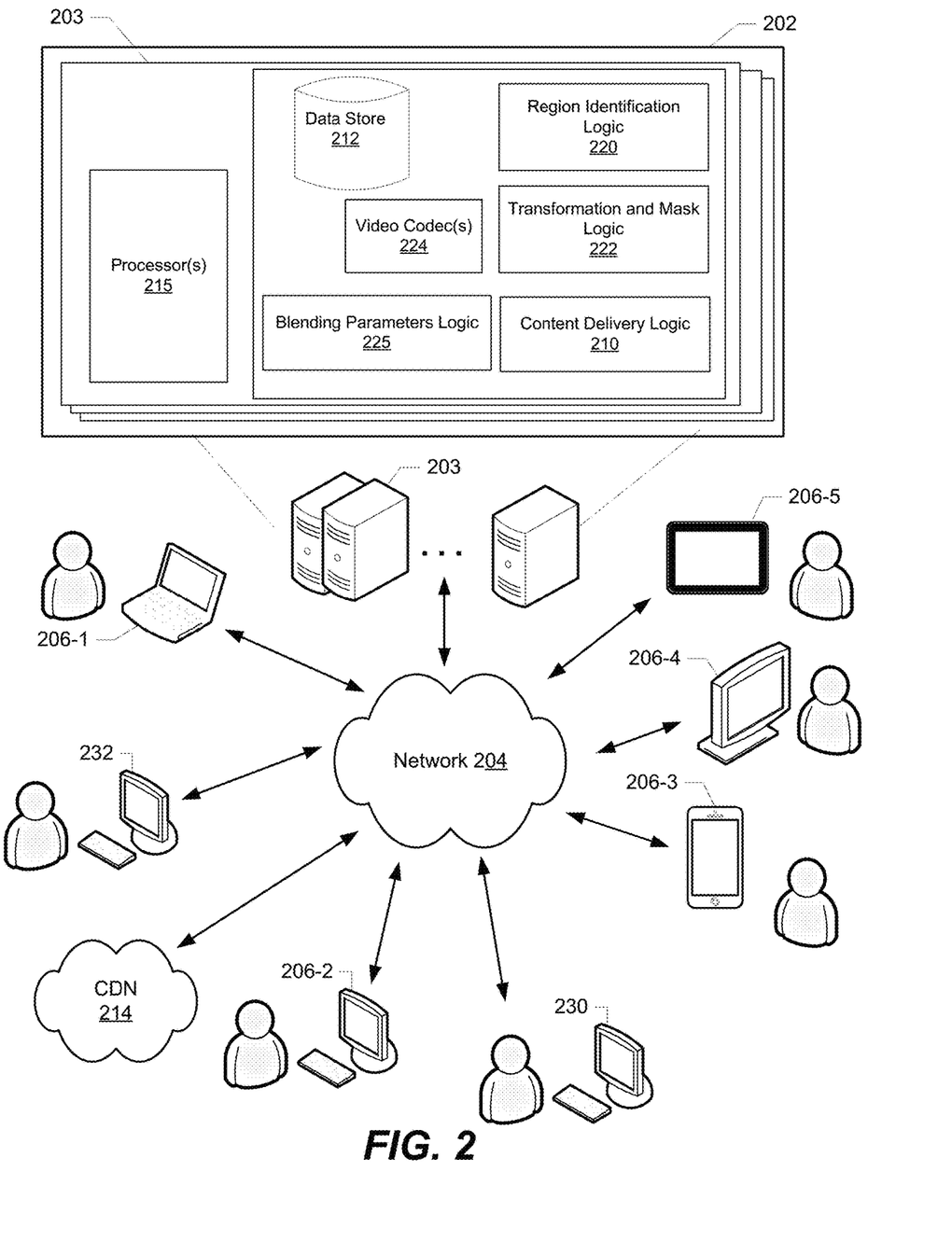
FIG. 2 presents an example of a computing environment in which implementations enabled by the present disclosure may be practiced.

FIG. 2 illustrates an example of a computing environment in which a video content service 202 provides streaming content for a live event (e.g., video and/or audio) via network 204 to a variety of client devices (206-1 through 206-5) in accordance with the techniques described herein. In various implementations, the streaming content may be a video presentation of a live event (e.g., a livestream, broadcast, and/or camera feed of an ongoing live event and/or a recording of a partially or fully-completed event which may also be referred to as formerly-live event). Content service 202 may conform to any of a wide variety of architectures such as, for example, a services platform deployed at one or more co-locations, each implemented with one or more servers 203. Servers 203 can include one or more processors 215, memory, and other hardware for performing the tasks disclosed herein. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 206 may be any suitable device capable of connecting to network 204 and consuming streaming content provided by service 202. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

Content service 202 may encode (using video codecs 224) captured video of a live event for delivery as a plurality of live streams that include different quality-level and bitrate versions of the content, delivered according to a number of streaming protocols including, for example, HTTP Live Streaming (HLS), Dynamic Adaptive Streaming over HTTP (DASH), and Smooth Streaming. Live streaming clients (e.g., device 206-1) consume the live content (delayed only a few seconds from the live action) using live manifests that are periodically made available by content service 202 as additional content is encoded and packaged. Fragments of content are then delivered over network 204

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 202 is described as if it is integrated with or includes the platform(s) that provides primary content and secondary replacement content to client devices, as well as supports the stitching of content as enabled by the present disclosure. However, it will be understood that content service 202 may provide access to primary and/or secondary replacement content in conjunction with one or more content delivery networks (e.g., CDN 214) that may or may not be independent of content service 202. In addition, the source(s) of one or both of the primary content and the replacement content may be independent of or integrated to various degrees with content service 202. Implementations are contemplated in which content may be stitched and/or encoded, and/or metadata manipulated by a service that is integrated with a content service (e.g., 202), by a service associated with the content provider, or as a third-party service. The range of variations known to those of skill in the art are contemplated to be within the scope of this disclosure.

Implementations enabled by the present disclosure contemplate logic resident on the client devices consuming video content from content service 202; such logic is configured to overlay secondary content on video frames of primary content, such as live events. Such logic might be part of an existing algorithm or module on the client device or implemented to work in conjunction with such an algorithm or module.

Content service 202 includes content delivery logic 210 that facilitates at least some aspects of content delivery to client devices 206. In some implementations, content delivery logic 210 facilitates providing segments of a live event, attributes associated with regions of frames of the segments, and secondary content as enabled by the present disclosure. In addition, content delivery logic 210 may include a personalization engine that selects one or more secondary content based, at least in part, on preferences of a user of a client device, characteristics of the user, characteristics of the client device, attributes of secondary content available in a repository of secondary content, and/or attributes of original segments of media content corresponding to regions for overlaying secondary content.

Content service 202 may also include region identification logic 220 configured to analyze media content segments and identify regions of the media content segments where secondary content may be overlaid. Content service 202 may also include transformation and mask logic 222 that facilitates the generation of transformations, such as homographic transformation, and masks, that may be provided to a client device to overlay secondary content. Content service 202 can also further include one or more video codecs 224, which may be used to encode media segments at one or more quality levels.

Content service 202 may further include blending parameters logic 325 that determines various parameters and effects to improve blending of the secondary content with the underlying video frame. Parameters and effects may include motion blur, spatial and/or temporal artifacts, compression artifacts, down-sampling, etc.

Content service 202 may also include a variety of information related to primary content and secondary content used to overlay on regions of the primary content. The information can include the primary and/or the secondary content, associated metadata, and manifests in data store 212 to which service 202 provides access. Alternatively, such information associated with and/or about the content, as well as the content itself may be provided and/or hosted by one or more separate platforms, e.g., CDN 214 or remote cloud storage. It should be noted that, while logic 210, 220, 222, and 225, and data store 212 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
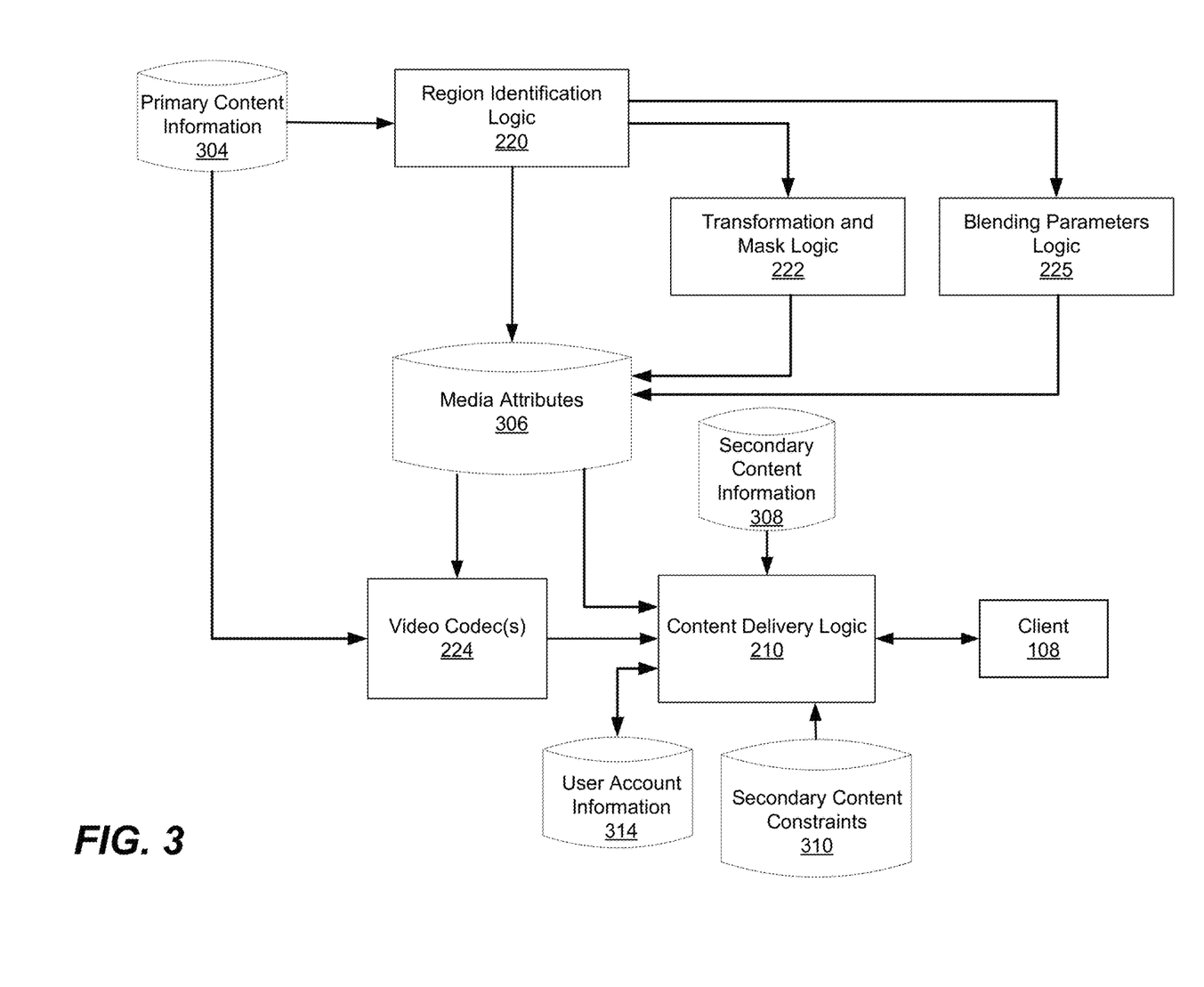
FIG. 3 presents a block diagram of an implementation of a content delivery system as enabled by the present disclosure.

FIG. 3 is a block diagram of an implementation of a content delivery system as enabled by the present disclosure. Region identification logic 220 accesses primary content information 304, which it uses to generate media attributes 306 associated with primary content. Primary content information 304 can include segments and manifests for a live event as well as video files for video on demand (VOD) content. Specifically, primary content information 304 can include, for live events, each of the manifests and updated manifest data along with corresponding segments of the live event. For VOD content, primary content information 304 may store each video title of a video content library, a video content item including one or more video files containing video content. For example, a video content item can include a movie or episode of a television show.

In some implementations, region identification logic 220 applies a set of algorithms which may include, for example, machine learning (ML) algorithms and/or computer vision techniques to aid in the analysis of primary content information 304. More particularly, computer vision techniques may be applied to identify regions of frames for overlaying secondary content. For example, computer vision techniques can be applied to frames of a media segment to identify regions and bounding boxes for overlaying secondary content, bounding boxes, homographic transformations, masks, and parameters for blending the secondary content with the frame. In some implementations, the tracking operations performed by the region identification logic 220 may use a deep-learning based algorithm referred to as DeepSORT (SORT:Simple Real time Tracker). In some implementations, the detecting operations performed by the region identification logic 220 may be based on Common Objects in Context (COCO) datasets. COCO is a large-scale object detection, segmentation, and captioning dataset, and images in the dataset may be everyday objects captured from everyday scenes. The detection operations may be trained using YOLOv3 model (YOLO: You Only Look Once). In some implementations, the COCO dataset may be finetuned using a custom dataset for a particular sporting event such as, for example, soccer. The region identification logic 220 may use motion and appearance features extracted from the bounding boxes to perform frame by frame data association and track generation.

A region may be categorized as a particular type of object such as a wall, billboard, player field, or player. In some implementations, the object may be classified as a 3D or 2D object. Region analysis logic 220 may also determine bounding boxes of the region, or bounding boxes may be determined by transformation and mask logic 222, described below.

Information generated and/or aggregated by region identification logic 220 may be stored in media attributes 306. Media attributes 306 can include, for a live event, frame level, region level, and/or pixel level attributes. Media attributes can also indicate relationships between and among regions/objects.

Media attributes 306 can include, for a given frame, attributes for one or more regions in that frame. Attributes may include a homographic transformation or mask for each region with a frame. Attributes for a given frame can include, but are not limited to, a categorization of object(s) within the frame (e.g., billboard, perimeter, player), a location (e.g., coordinates) of object(s) within the frame, information identifying surface(s) of object(s) within the frame, attributes of the objects (e.g., size, coordinates, pixel information such as texture and color, relative size in comparison to frame size), and/or attributes of surfaces of objects (e.g., size, relative size in comparison to frame size, coordinates, angle, pixel information such as texture and color). Attributes of an object can include 3D information such as depth of the object, orientation of the object, and/or position of the object. Attributes of an object or associated surface can also indicate proximity of the object/surface to action represented in the frame (e.g., background/foreground).

In some implementations, media attributes 306 include information associated with regions that have been identified. A region can include a categorization of an object represented with a clip and an identification of a surface of the object that is suitable for positioning of a "virtual" placement. Information associated with a region can further include attributes of the region. Attributes of a region can include attributes of object(s) on which secondary content can be "placed" (e.g., categorization, relative size of the object relative to other content, pixel coordinates, etc.) and/or attribute(s) surface(s) on which the secondary content can be "placed" (e.g., whether the surface is vertical or horizontal, whether the surface is flat or curved, relative size of the surface, etc.). Attributes of a candidate placement can further include a duration of time that the candidate placement is visible on screen, a type of placement (e.g., billboard, signage, 2D object, 3D object, video), relative size of the placement, and/or proximity to action (e.g. background/foreground).

In some implementations, input may be submitted by a human moderator (not shown to simplify illustration) to facilitate the generation of media attributes 306. In some instances, a set of training data includes a set of annotations associated with a video content item. The set of training data can be used to generate a machine learning model and/or computer vision algorithm, as described herein. Input can also include a modification of media attributes 306.

As shown in FIG. 3, transformation and mask logic 222 uses primary content information 304 and regions identified by region identification logic 220 to generation homographic transformations and masks for each region. Various techniques may be used to generate transformation and masks for each region, including computer vision and machine learning techniques. One technique to generate a homographic transformation that may be used by transformation and mask logic 222 involves analyzing video frames to identify keypoints and dense features. As an example, a video frame t may be processed through an algorithm employing machine learning (e.g., an artificial neural network). The algorithm may be trained to identify and locate keypoints P, and dense features D, that are visible within the image frame t. The keypoints P, and dense features D, may correspond with a region template or be used to identify a region. The algorithm may be generalized and capable of processing a variety of region templates or may be specialized for a given region template (e.g., a template for a sports field perimeter, a template for a particular playing field, etc.). A homographic transformation H, for video frame t between an image plane and a plane associated with the region can be determined based on the identified keypoints Pr. The homographic transformation between the image plane and the plane associated with the region refers to the transformations that occur between the image plane and the plane associated with the region. Additional techniques for determining homographic transformations are described in U.S. patent application Ser. No. 16/948,348, filed Sep. 14, 2020, which is incorporated herein by reference in its entirety and for all purposes.

To generate a mask, transformation and mask logic 222 may be configured to operate with secondary content and use texture and color-based methods to perform a pixel level region surface segmentation. For example, the pixel level region surface segmentation may be used so that secondary content can be visualized on the region surface pixels. Other pixels that belong to the foreground, such as players, officials or any other foreground portion in the region may not be changed while overlaying the secondary content. This may enable providing an effect that since the secondary content is on a plane, the secondary content may get occluded by any other foreground portions in the region. In some implementations, the region segmentation for a single frame may include image size reduction which reduces image size to a smaller size such that the operations can be computationally efficient while still capturing the unique color and texture features of the region. The region segmentation may further include texture filtering which uses entropy-based texture filtering and Otsu thresholding to create a rough estimate of the region surface based on texture, color conversion which converts the pixels to CIELab color space as defined by the International Commission on Illumination for measuring object color where distances have a perceptual meaning, and color-based segmentation which performs color-based segmentation using a Gaussian Mixture Model (GMM). The number of clusters used may be based on accuracy and efficiency constraints. Using larger number of clusters may result in a larger convergence time for the Expectation Maximization (E-M) algorithm used to train the GMM. The region segmentation may combine texture and color-based segmentations to identify the color clusters which have intersection with the texture-based region segmentation, and region pixel identification which use pixels from the previously identified color labels as region pixels.

Data generated by the transformation and mask logic 222 may be used to determine how to place secondary content in a region, e.g., on a billboard or a player. In some implementations, the transformation and mask logic 222 may be configured to extract the static graphics components present in the broadcast stream such as, for example, score boards and logos. This may be performed based on an assumption that the pixels associated with those static graphics components don't change as significantly as other pixels. The extracted static graphics components may be used to identify areas that the secondary content should not overlay. In some implementations, the transformation and mask logic 222 may be implemented using deep learning-based methods involving semantic segmentation models such as Mask R-CNN (regional convolutional neural network) and DeepLabv3.

Similarly, blending parameters logic 225 uses primary content information 304 and regions identified by region identification logic 220 to generate metadata for blending secondary content with the video frame. Video frames may have various features or effects, including artifacts from compression or resolution as well as motion blur effects, that secondary content may not include, particularly considering that some forms of secondary content, such as 2-dimensional logos, may be delivered to a client device at a high and clear resolution. Blending parameters logic 225 may determine various parameters and artifacts for modifying secondary content to realistically blend secondary content with a video frame in the associated region. These parameters and artifacts may then be provided to a client device that can use these parameters and artifacts to improve the overlay of secondary content.

Secondary content information 308 can include a plurality of secondary content items. A secondary content item can include static content or dynamic content. In addition, a secondary content item can include 2D or 3D content. Examples of static, two-dimensional content include an image and/or alphanumeric characters representing, for example, a brand or logo. Dynamic content can include, for example, an animated logo, a video corresponding to an advertisement, a television episode, or a movie. 3D content can include a representation of a physical object such as a beer bottle, speaker, or automobile.

A secondary content item may be referred to as an overlay. An overlay can include a single frame or a sequence of frames. An overlay can include a background that is transparent or solid.

In some implementations secondary content may include different resolutions of the same secondary content. For example, if a manifest includes 10 different bitrate options for a media presentation for a client device to request for playback, then 10 corresponding resolutions of secondary content to be overlaid on frames of the media presentation may be provided to a client device. In some implementations, a single, high-resolution version of the secondary content is provided to the client device. The high-resolution version may match the highest resolution available for streaming by the client device. In such implementations, the client device may then down-sample the high-resolution version to match the resolution of the segment requested for playback. In some implementations the attributes may include metadata to help the client down-sample the secondary content to match the resolution of the segment requested for playback.

As noted above, some attributes may change based on the bitrate version requested by the client device, e.g., down-sampling metadata or compression artifact metadata. Other attributes may not change based on the bitrate version requested. These attributes may include the bounding box, homographic transformation, mask, and motion blur effects. Thus, in some implementations, some of the attributes provided to the client device may be based on the bitrate option requested by the client device for playback.

Secondary content information 308 can also include metadata that indicates attributes of the secondary content items. For example, the attributes of a secondary content item can include, but are not limited to, a name of an object (e.g. product name) represented within the secondary content item, a category or type of the object (e.g., beverage, soft drink, alcoholic drink, wine, furniture, cosmetics, video content, etc.), a brand of the object, a country of manufacture of the object, a geographic region or location in which the object can be purchased, and/or attributes of individuals (e.g., consumers) to whom the secondary content item is targeted (e.g., adults over 21, women, golfers). Attributes of a secondary content item can also include a uniform resource locator (URL), hypertext link, address, and/or other information corresponding to a location from which the object can be purchased or otherwise obtained.

Secondary content constraints 310 may include rules that can be used to match secondary content items with regions of frames of media content items. More particularly, the rules may include or be used to generate a "mapping" between compatible region types (e.g., player field, billboard) and attributes of compatible secondary content (e.g., product type, product category, brand, dimensions). Constraints 310 can specify secondary content items (or associated attributes) that are permitted (or, conversely, not permitted) to be "placed" in primary content. Similarly, constraints 310 can specify or indicate primary content (e.g., specific region types or objects) that is permitted (or, conversely, not permitted) to include specific secondary content or secondary content having specific attributes. In some implementations the secondary content constraints associated with secondary content provided to a client device may be provided to the client device. The client device may then select secondary content to overlay based on the secondary content constraints and attributes associated with a region for overlaying secondary content.

Client device 108 can request a live manifest or media segment from content delivery logic 210. Content delivery logic 210 may access a user account associated with client device 108 from user account information 314. A user account may also be referred to as a user profile or account profile. User account information 314 may indicate attributes of the user. The attributes of the user may include those that have been explicitly provided by the user, as well as those that have been determined based upon the user's online activities. For example, the attributes of the user may identify prior online purchases or other information pertaining to prior purchases, viewing history of media content items, previous click history in relation to advertisements or other content provided to the user, a location of the user, and/or other demographics. These attributes of the user may be used to determine which secondary content to provide to client device 108.

Figure 4:
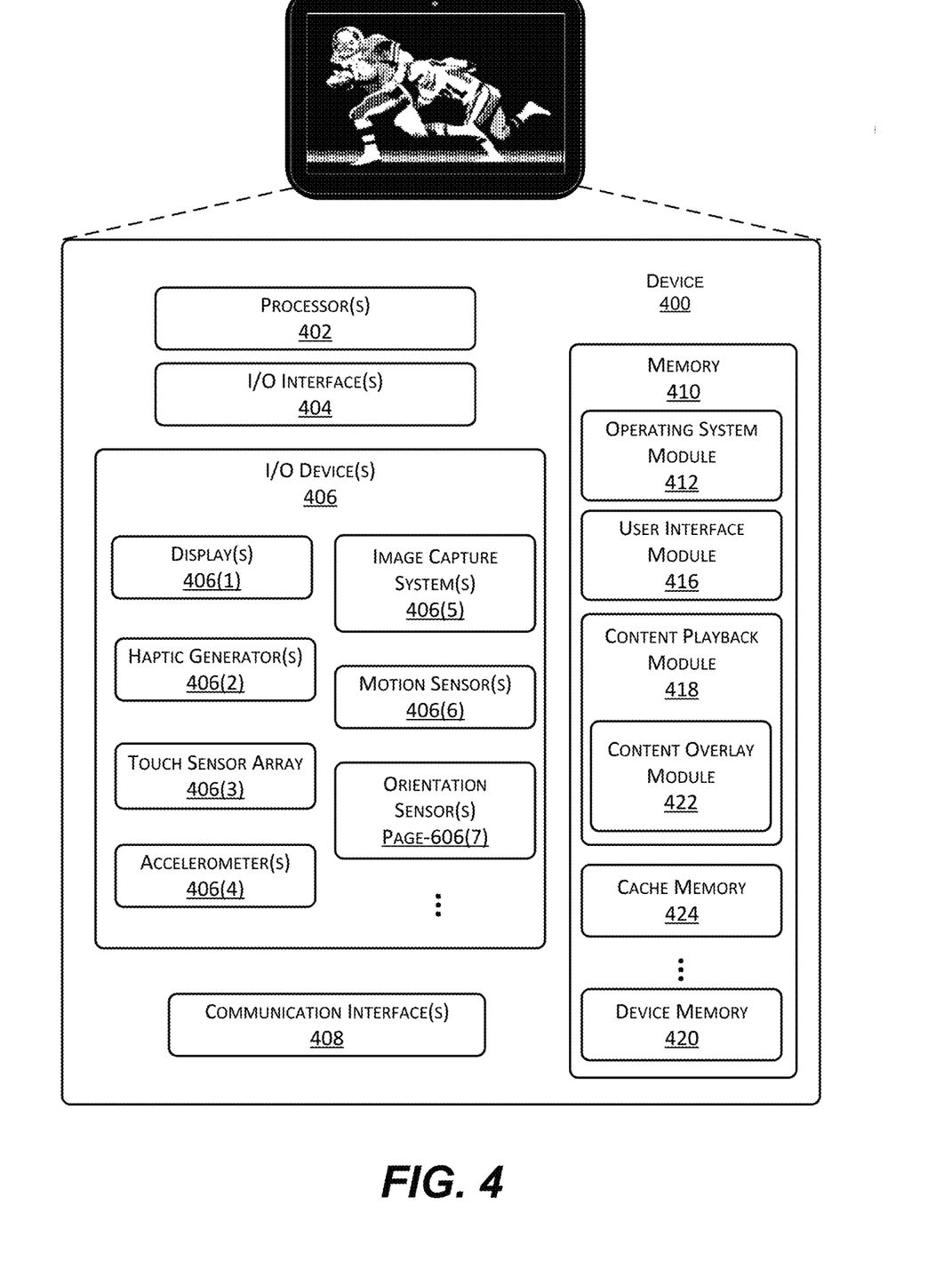
FIG. 4 presents an example of a client device which may be employed with implementations enabled by the present disclosure.

A block diagram of an example of a client device 400 suitable for use with various implementations is shown in FIG. 4. As mentioned above, it should be understood that device 400 may be any of a wide variety of device types. Device 400 (depicted as a tablet device) includes one or more single or multi-core processors 402 configured to execute stored instructions (e.g., in device memory 420). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 404 is coupled to one or more I/O devices 406 which may or may not be integrated with client device 400.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, a content playback module 418, and other modules. Memory 410 also includes device memory 420 to store a wide variety of instructions and information using any of a variety of formats including, for example, flat files, databases, linked lists, trees, or other data structures. Such information includes content for rendering and display on display 406(1) including, for example, any type of video content. In some implementations, a portion of device memory 420 may be distributed across one or more other devices including servers, network attached storage devices, and so forth.

The logic (represented by 422 in FIG. 4) used to overlay secondary content on video frames of a live event (which may be stored in cache memory 424) using attribute metadata as described herein may be implemented in a variety of ways, e.g., in hardware, software, and/or firmware. It will also be understood that device 400 of FIG. 4 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

The client device 400 may be configured to receive a bounding box defining a location of a region for overlaying secondary content and attributes that may be used to scale the size of the secondary content with respect the bounding box using content overlay module 422. Content overlay module 422 may be configured to blend the secondary content on the region surface for jitter removal and smoothing. In some implementations, the Savitzky-Golay filtering may be used for noise reduction along with an exponential smoothing. The blending of the secondary content may be made directly onto each of the frames of a media segment. The content overlay module 422 may also be configured to generate the secondary content (e.g., an ellipse or simple graphic) in a color that may enable the secondary content to be visible when used with the color of the region surface (e.g., secondary content that emphasizes a player on a sports field having possession of a play object). The content overlay module 422 may also be configured to use a perspective transformation such as, for example, homography transformation, from the region coordinates to the image coordinates so that the secondary content may appear to be realistic on the region surface. The content overlay module 422 may blend the secondary content with the video frame (e.g., frame 132*a*) to generate the blended video frame (e.g., frame 132*b*). The blended video frame may then be presented for playback with the secondary content. Content overlay module 422 may be configured to perform the overly and blending of secondary content for each video frame in a sequence, based on corresponding attributes for regions in each video frame.

Figure 5:
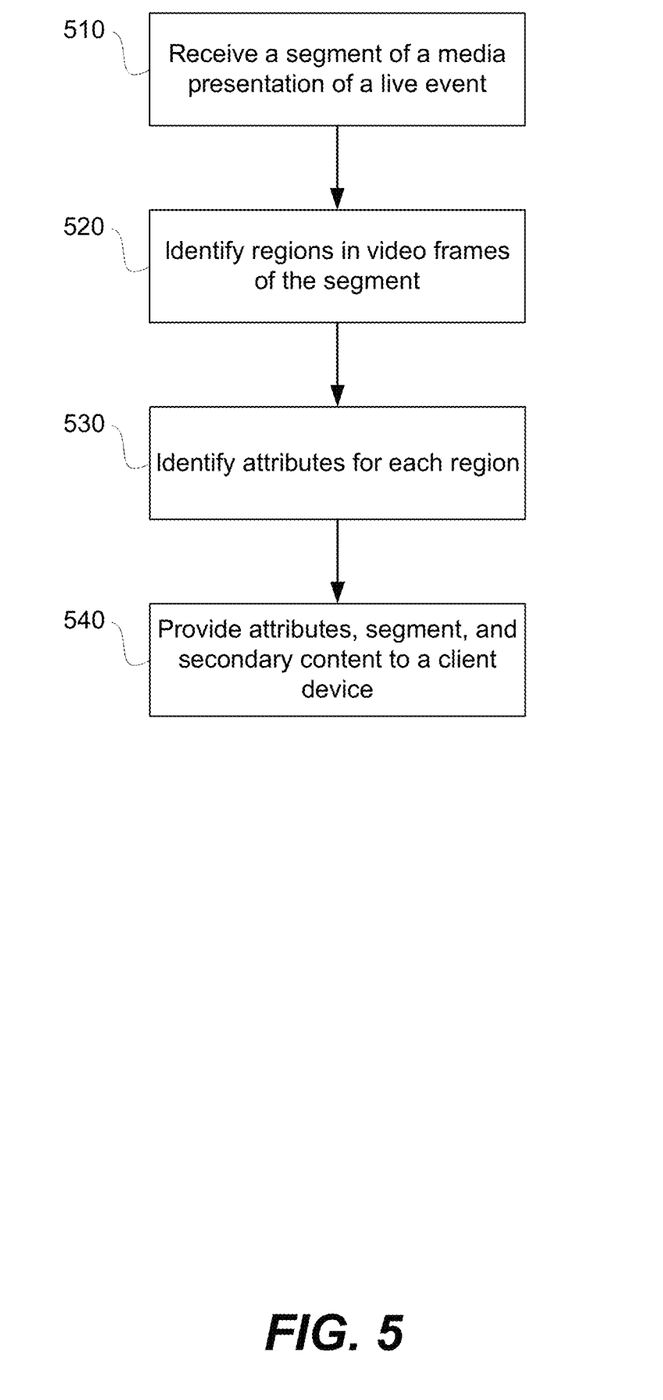
FIG. 5 presents a flow diagram illustrating an example of an implementation of identifying regions for secondary content insertion and attributes of the regions.

FIG. 5 is a flow diagram illustrating operation of a particular implementation enabled by the present disclosure. In some implementations FIG. 5 presents operations that may be performed by a server 203. In some implementations operations described in FIG. 5 may be performed by different servers, particularly in implementations where secondary content may be provided from a different source than the primary content. In some implementations, the operations of FIG. 5 may be performed for each segment and/or each video frame of a live event. The operations of FIG. 5 may be performed for a sequence of video frames to continuously overlay secondary content for that sequence. As shown in FIG. 5, a segment of a media presentation of a live event is received (510). Regions for overlaying secondary content may then be identified in each video frame of the segment (520). While the above discussion focused on a single region for overlaying secondary content, it should be understood that the number of regions of identified for overlaying secondary content is not restricted to a single instance. In some implementations, 2, 3, or more regions for overlaying secondary content may be identified, commensurate with determining attributes for each region.

After identifying regions for overlaying secondary content, attributes for each region are determined (530). Attributes may include a bounding box, homographic transformation, mask, blending parameters/features, etc. The attributes, taken collectively, may allow a client device or other logic to transform secondary content to realistically overlay on the target region. A bounding box may define the region in which to overlay content. A homographic transformation may define a transformation of the secondary content from a form provided to a client device (typically in an image plane) to fit within a plane of the region. A mask may specify foreground and background portion associated with the first region. In some implementations the mask may use rules to specify foreground and background pixels, e.g., if the pixel color is green, it is part of the playing field and considered a background pixel, while a color other than green is part of the foreground and should not be occluded by secondary content overlay. In some implementations attributes may be the same for multiple regions. For example, motion blur parameters or compression artifacts may be the same for multiple regions or all regions, and thus such attributes may be associated with multiple regions.

The attributes, media segment, and secondary content are then provided to a client device (540). In some implementations, instructions may also be sent to the client device to cause the client device to overlay the secondary content on frames of the media segment based on the attributes. The same secondary content may be used for multiple regions, or different secondary content may be used for each region. Additional information may also be provided to the client device. For example, updated manifest data may be sent to the client device to allow the client device to request the most recently encoded segments of the media presentation of a live event.

In various implementations the secondary content may be provided to the client device separately from the media segment or attributes. Secondary content may be provided prior to beginning playback of the live event. In some implementations additional secondary content may be provided to the client device to supplement or replace previously provided secondary content. For example, if a new advertisement is intended to be displayed on a billboard, the new advertisement may be provided to the client device with instructions to change the overlay to the new advertisement. Secondary content may also be provided based upon user information associated with the client device, allowing for personalized advertising content to be provided and overlaid by the client device.

In some implementations an item of secondary content, e.g., an advertisement, may be overlaid over a region identified in a video frame for a period of time. As noted above, region identification logic 220 may track the region across frames and provide updated attributes for the client device to properly track the overlay of secondary content. In some implementations the updated attributes may be defined relative to previously provided attributes. For example, an updated mask may be defined relative to a previously provided mask. This may allow the updated mask to be encoded more efficiently by only providing changes from a previously provided mask. Other attributes described herein may also be updated by reference to previously provided attributes.

In some implementations the secondary content may be updated, e.g., a different advertisement is to be overlaid on a region. Updating the secondary content may be based upon a bandwidth availability of the client device to download new secondary content, time to first frame, or duration of buffered media content. Generally, updating the secondary content should not disrupt playback of the live event, such that content service 202 may determine that, based on the factors noted above, updating the secondary content would not disrupt playback of the live event. In such implementations new secondary content may be provided to the client device to replace or supplement the previously provided secondary content.

In some implementations, some attributes may be at least partially defined prior to a live event. For example, cameras for a sports game or concert venue may have limited degrees of freedom, such that it may not be able to pan across an area but can zoom in or out. In such implementations, calibration information about the camera's position and orientation may be used to at least partially determine homographic transformations for regions in frames captured by that camera. For example, a billboard within the field of view of the camera may have a fixed position relative to that camera, such that a homographic transformation between the image plane of the camera and the region of the billboard may be determined prior to the event and used for video frames captured by that camera. Thus, some of the attributes may be determined prior to the live event, reducing the computational intensity of determining attributes for each video frame during the live event.

In various implementations the attributes may be provided to the client device together or separately from the media segment. In implementations that use a manifest, such as DASH or HLS protocols, attributes may be provided as part of live manifest updates, included in the fragments requested by client devices using the manifest, or referenced in the manifest for a client to separately request. For example, in some implementations the manifest may include references for a client device to request mask data. In some implementations the attributes may be encoded as metadata that is integrated with the media segment, e.g., encoded by video codec(s) 224. In other implementations that use a stateful protocol such as Real-Time Messaging Protocol (RTMP), a separate stream may be used to deliver attributes to client devices.

In some implementations, some attributes may be compressed to reduce bandwidth requirements for delivering those attributes to the client device. For example, a mask can be a relatively large file in that it specifies foreground and background portions in a region. As the mask includes many repeating values (e.g., occlude or do not occlude), it may be efficiently compressed. A live manifest may then include a reference to the compressed mask for a client device to retrieve and decompress prior to overlaying secondary content.

In some implementations, attributes may be included in supplemental enhancement information (SEI) messages. SEI messages may be used to provide metadata as part of a bitstream, which a client device may then receive and use to overlay secondary content on primary content. In some implementations, homographic transformations, bounding boxes, blending parameters, or any combination thereof may be included in SEI messages sent to and received by a client device.

Figure 6:
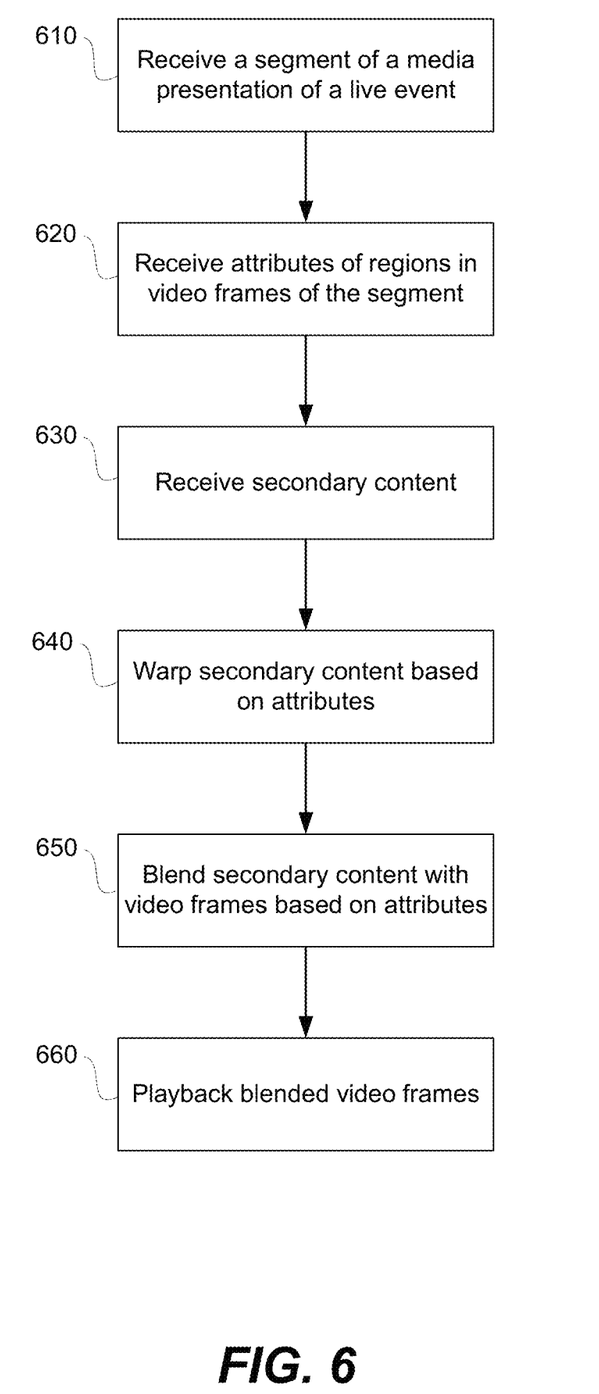
FIG. 6 presents a flow diagram illustrating an example of an implementation of a client device blending secondary content with a video frame based on attributes of a region of the video frame.

FIG. 6 is a flow diagram illustrating operations of a particular implementation enabled by the present disclosure. In some implementations FIG. 6 presents operations that may be performed by a client device 400. In some implementations, the operations of FIG. 6 may be performed for each segment of a live event. As shown in FIG. 6, a segment of a media presentation of a live event is received (610). Attributes of regions for overlaying secondary content in one or more video frames of the segment is received (620). Secondary content to overlay in regions of one or more video frames of the segment is received (630). In some implementations, secondary content may be received prior to the live event. Secondary content may be cached by the client prior to the live event to reduce bandwidth usage during the live event. In some implementations, updated secondary content may be received and cached by the client device during the live event.

The client device may then warp the secondary content based on at least some of the received attributes (640). For example, the attributes may identify regions in which to overlay content. Corresponding homographic transformations may define a transformation of the secondary content from a form provided to the client device (typically in an image plane) to fit within a plane of the region. Corresponding masks may define foreground and background pixels associated with the first region.

The client device may then blend the secondary content with the video frames using at least some of the received attributes (650). For example, the attributes may include bounding boxes that define the regions in which to overlay content. The warped secondary content may be positioned in the video frames based on the bounding boxes. The warped secondary content may also be blended based on blending parameters that define how to modify the secondary content to look realistic in the region, e.g., motion blur parameters, resolution artifacts, or compression artifacts. In some implementations a single set of blending parameters may be used for multiple regions, e.g., all regions are blended using the same motion blur parameters, rather than unique motion blur parameters for each region. In other implementations there may be blending parameters for a region that are different from blending parameters for other regions.

In some implementations, blending may not be performed by the client device. Client devices configured to overlay secondary content as described herein may have various capabilities for performing warping and blending operations. In some implementations, the client device may be unable to perform some of the blending operations without causing a buffering event or otherwise falling behind the live head. In such implementations, the client device may not perform one or more of the blending effects described herein, including motion blur effects, compression artifacts, resolution downscaling, etc. In some implementations, the attributes may include metadata that a client device may use to determine whether to skip any of the blending operations. For example, the metadata may indicate an estimated computational intensity of the blending operations, which a client device may use to determine which blending operations to skip to ensure playback stays near the live head or a buffering event does not occur. In some implementations the attributes include a prioritization for which blending effects a client device should perform given limited capabilities to perform all blending operations.

In some implementations, secondary content is not overlaid on all regions identified in the attributes received by a client device. As noted above, a client device may lack the capability to overlay secondary content on all the regions identified in the attributes. In such implementations the client device may overlay secondary content on fewer than all regions identified in the attributes. In some implementations, the attributes may include a prioritization order for which regions, or which secondary content, is to be prioritized by the client device for overlay on the video frames. The client device may then use the prioritization order to determine on which regions to overlay secondary content. In some implementations the attributes may include metadata that a client device may use to determine a combination of which regions to overlay with secondary content and which blending operations to perform for each region.

As the attributes define how the secondary content is to be overlaid on the video frames and are provided to the client device, the client device is able to avoid the computationally intensive task of determining these attributes. Instead, the client device may efficiently carry out the appropriate warping and blending to overlay the secondary content while maintaining near real-time playback close to the live head. The blended video frame that includes the secondary content overlay may be played back for viewing by a user (660).

Although implementations have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may." unless specifically stated otherwise, or otherwise understood within the context as used, is generally intended to convey that certain implementations could include, while other implementations do not include, certain features, elements, and/or steps. Thus, such conditional language is not generally intended to imply that features, elements, and/or steps are in any way required for one or more implementations or that one or more implementations necessarily include logic for deciding, with or without user input or prompting, whether these features, elements, and/or steps are included or are to be performed in any particular implementation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    receiving, by a client device, a first segment of media content associated with a media presentation of a live event;
    receiving, by the client device, secondary content;
    receiving, by the client device, attributes associated with a first frame of the first segment, wherein the attributes correspond to a first region of the first frame, and wherein the attributes include a homographic transformation between an image plane and a plane associated with the first region;
    modifying, by the client device, the secondary content based on the homographic transformation; and
    overlaying, by the client device, the secondary content on the first region of the first frame based on the attributes.

2. The method of claim 1, wherein the attributes includes a mask that specifies portions of the first region as foreground or background.

3. The method of claim 2, wherein the mask specifies portions of the first region as foreground or background based on one or more properties of pixels covered by the mask.

4. The method of claim 2, wherein the mask is compressed, and the method further comprises decompressing the mask.

5. The method of claim 1, wherein the attributes includes motion blur parameters of the first frame, and the method further comprises modifying the secondary content based on the motion blur parameters.

6. The method of claim 1, wherein the resolution of the secondary content is higher than the resolution of the first frame, and the method further comprises modifying the secondary content based on the resolution of the first frame.

7. The method of claim 1, wherein the attributes are received as part of the first segment of media content.

8. The method of claim 1, wherein the secondary content comprises multiple images, and the method further comprises selecting, by the client device, one of the images for overlaying on the first region.

* * * * *